United States Patent
Okuyama et al.

(10) Patent No.: US 11,774,304 B2
(45) Date of Patent: Oct. 3, 2023

(54) TORQUE SENSOR AND TORQUE DETECTION DEVICE

(71) Applicant: Hitachi Metals, Ltd., Tokyo (JP)

(72) Inventors: Ken Okuyama, Tokyo (JP); Teruyuki Nakamura, Tokyo (JP); Naoki Futakuchi, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 26 days.

(21) Appl. No.: 17/561,843

(22) Filed: Dec. 24, 2021

(65) Prior Publication Data

US 2022/0228935 A1 Jul. 21, 2022

(30) Foreign Application Priority Data

Jan. 19, 2021 (JP) ................. 2021-006739

(51) Int. Cl.
*G01L 3/00* (2006.01)
*G01L 3/10* (2006.01)

(52) U.S. Cl.
CPC .................... *G01L 3/102* (2013.01)

(58) Field of Classification Search
CPC ................... G01L 3/10; G01L 3/102
See application file for complete search history.

(56) References Cited

U.S. PATENT DOCUMENTS 10,228,298 B2 * 3/2019 Shimizu ............. B29C 45/33
10,697,842 B2 * 6/2020 Wakiwaka ............ G01L 3/102
2009/0301223 A1 * 12/2009 Sihler ................. G01L 3/102
  73/862.333
2015/0307127 A1 * 10/2015 Aoki ................... G01L 3/104
  73/862.333
2017/0370784 A1 * 12/2017 Neuschaefer-Rube ... G01L 3/10
2018/0067007 A1 * 3/2018 Shimizu ................ B29C 45/37
2022/0134618 A1 * 5/2022 Jin .................... B29C 45/14467
  361/679.01
2023/0053507 A1 * 2/2023 Takemoto ............. G01N 27/83

FOREIGN PATENT DOCUMENTS

JP    2017-049124 A    3/2017

* cited by examiner

*Primary Examiner* — Max H Noori
(74) *Attorney, Agent, or Firm* — Thomas W. Cole; Calderon Safran & Cole PC

(57) ABSTRACT

A torque sensor to detect torque transmitted by a shaft having magnetostrictive properties is provided with a pair of cylindrical detection units arranged around the shaft and aligned side-by-side in an axial direction of the shaft, and first and second connection lines connecting the pair of detection units. Each detection unit includes first to fourth detection coils stacked in a radial direction. A series circuit formed by series connecting the first and fourth detection coils is parallel connected to a series circuit formed by series connecting the second and third detection coils. The first and second connection lines are configured to connect between corresponding connecting portions of the first and fourth detection coils and between corresponding connecting portions of the second and third detections coils, respectively. The torque transmitted by the shaft is detected based on a potential difference between the first connection line and the second connection line.

4 Claims, 7 Drawing Sheets

TORQUE SENSOR AND TORQUE DETECTION DEVICE

CROSS-REFERENCE TO RELATED APPLICATIONS

The present patent application claims the priority of Japanese patent application No. 2021-006739 filed on Jan. 19, 2021, and the entire contents of Japanese patent application No. 2021-006739 are hereby incorporated by reference.

TECHNICAL FIELD

The present invention relates to a torque sensor and a torque detection device.

BACKGROUND ART

As a conventional magnetostrictive torque sensor to detect torque applied to a shaft having magnetostrictive properties in which magnetic permeability changes when a torque is applied, a sensor is known which senses a change in magnetic permeability of the shaft based on changes in inductances of coils arranged near the shaft (see, e.g., Patent Literature 1).

In the torque sensor described in Patent Literature 1, detection coils are formed on plural wiring layers of a cylindrical curved flexible substrate and the flexible substrate is concentrically arranged around a shaft to be subjected to detection of torque.

CITATION LIST

Patent Literature

Patent Literature 1: JP 2017-49124A

SUMMARY OF THE INVENTION

In some cases, relative eccentricity may occur between the shaft and the torque sensor due to misalignment during installation of the magnetostrictive torque sensor, temperature change, or external stress, etc. Particularly when used in a high vibration environment such as in an automobile, relative eccentricity between the shaft and the torque sensor may occur also by vibration in addition to influence of manufacturing tolerance or installation tolerance, etc. The present inventors have confirmed that when eccentricity occurs between the shaft and the torque sensor, detection accuracy may decrease due to the effect of this eccentricity.

It is an object of the invention to provide a torque sensor that can suppress a decrease in torque detection accuracy due to eccentricity of a shaft to be subjected to detection, and a torque detection device using such a torque sensor.

So as to achieve the above object, one aspect of the present invention provides a torque sensor to detect torque transmitted by a shaft having magnetostrictive properties, the torque sensor comprising:

a pair of cylindrical detection units arranged around the shaft and aligned side-by-side in an axial direction of the shaft; and first and second connection lines connecting the pair of detection units, wherein each of the pair of detection units comprises first and third detection coils comprising first straight portions inclined at a predetermined angle relative to the axial direction of the shaft and second and fourth detection coils comprising second straight portions inclined in an opposite direction to the first straight portions at the predetermined angle relative to the axial direction of the shaft, wherein the first to fourth detection coils are stacked in a radial direction, wherein the first to fourth detection coils form a series-parallel circuit in which a series circuit formed by series connecting the first and fourth detection coils is parallel connected to a series circuit formed by series connecting the second and third detection coils, wherein the first connection line connects a connecting portion between the first and fourth detection coils of one of the pair of detection units to one of a connecting portion between the first and fourth detection coils and a connecting portion between the second and third detection coils of the other detection unit, wherein the second connection line connects a connecting portion between the second and third detection coils of the one of the pair of detection units to the other of the connecting portion between the first and fourth detection coils and the connecting portion between the second and third detection coils of the other detection unit, and wherein the torque transmitted by the shaft is detected based on a potential difference between the first connection line and the second connection line.

Effect of the Invention

According to the present invention, it is possible to provide a torque sensor that can suppress a decrease in torque detection accuracy due to eccentricity of a shaft to be subjected to detection, and a torque detection device using such a torque sensor.

BRIEF DESCRIPTION OF DRAWINGS

FIGS. 7A and 7B are diagrams illustrating a modification of the invention, wherein

BEST MODE FOR CARRYING OUT THE INVENTION

Embodiment

An embodiment of the invention will be described below in conjunction with the appended drawings.

(Configuration of Torque Sensor and Torque Detection Device)

Figure 1:
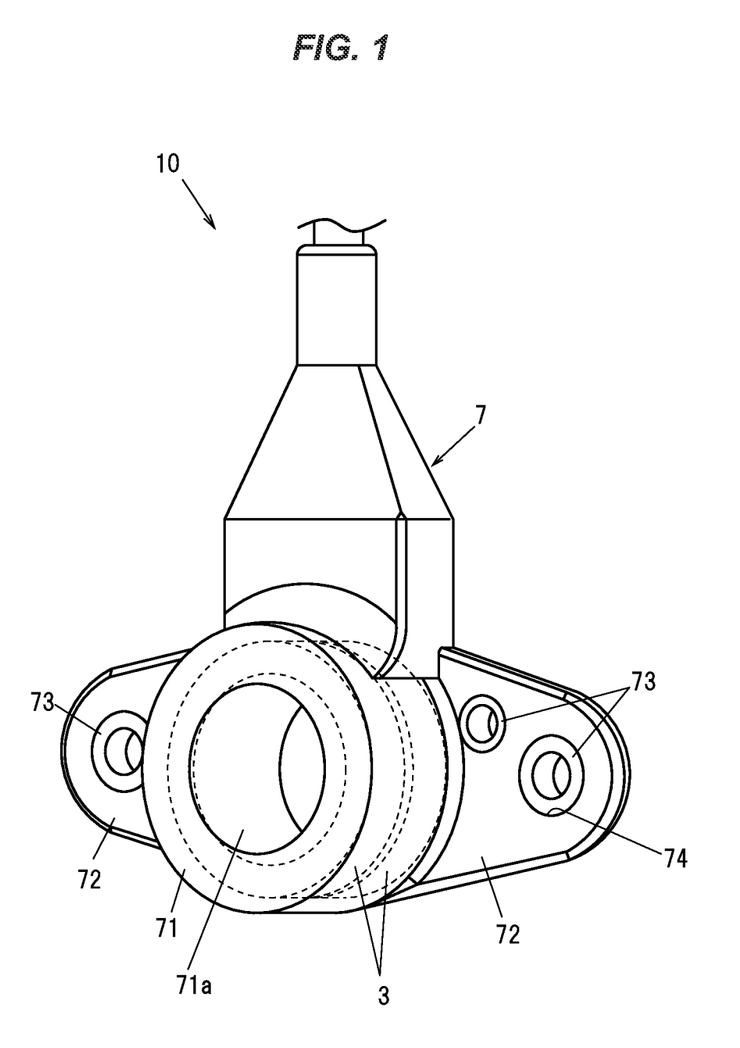
FIG. 1 is a perspective view showing an appearance of a magnetostrictive torque sensor in an embodiment of the present invention.
Figure 2A:
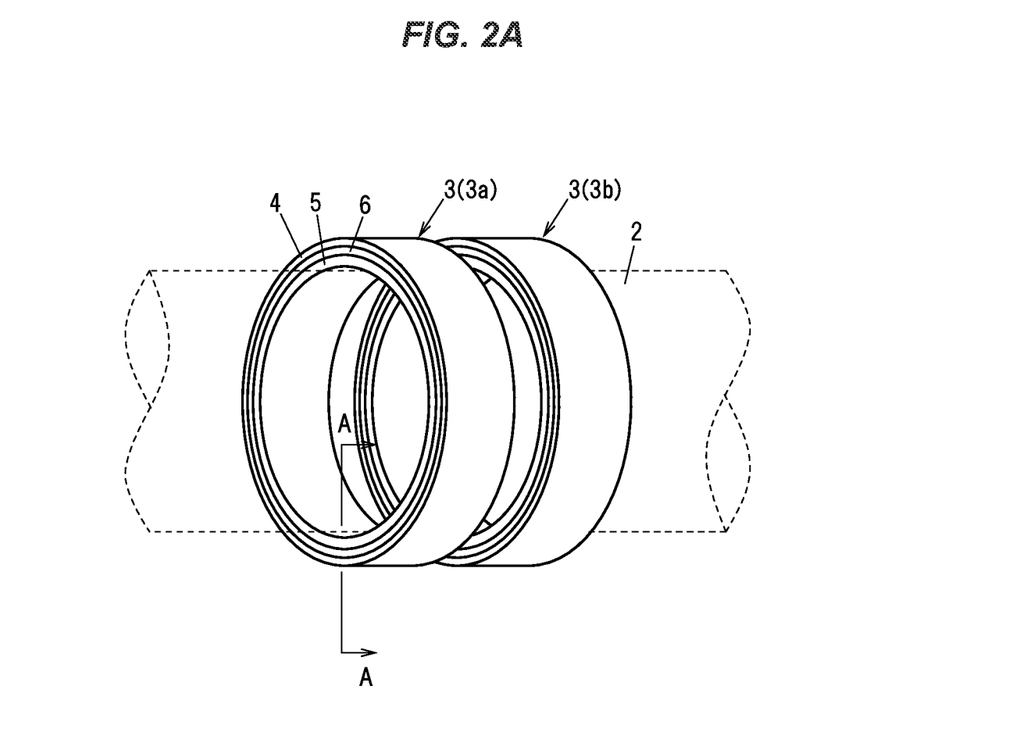
FIG. 2A is a perspective view showing a pair of detection units of the torque sensor shown in FIG. 1.
Figure 2B:
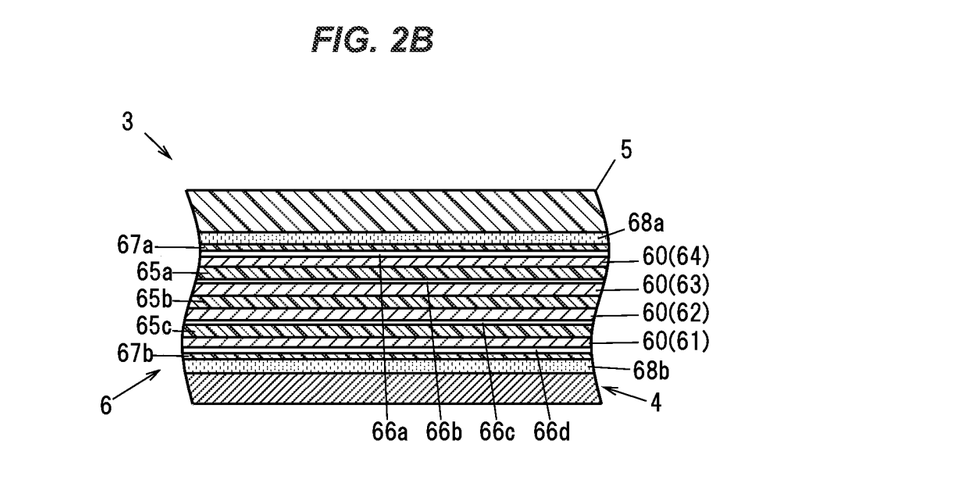
FIG. 2B is a cross-sectional view showing a stacking structure of a flexible substrate and a magnetic ring.
Figure 3:
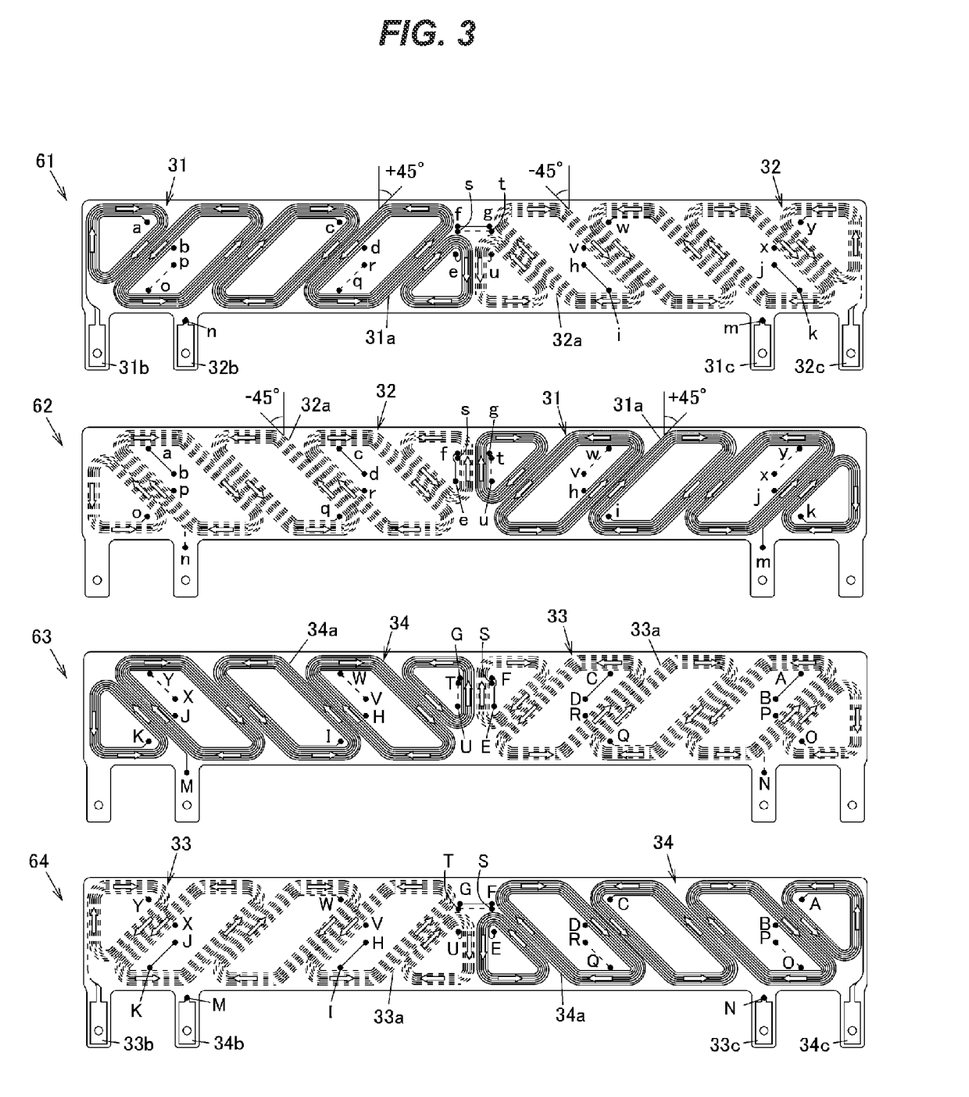
FIG. 3 is a diagram illustrating an example of a wiring pattern formed on each wiring layer of the flexible substrate.
Figure 4:
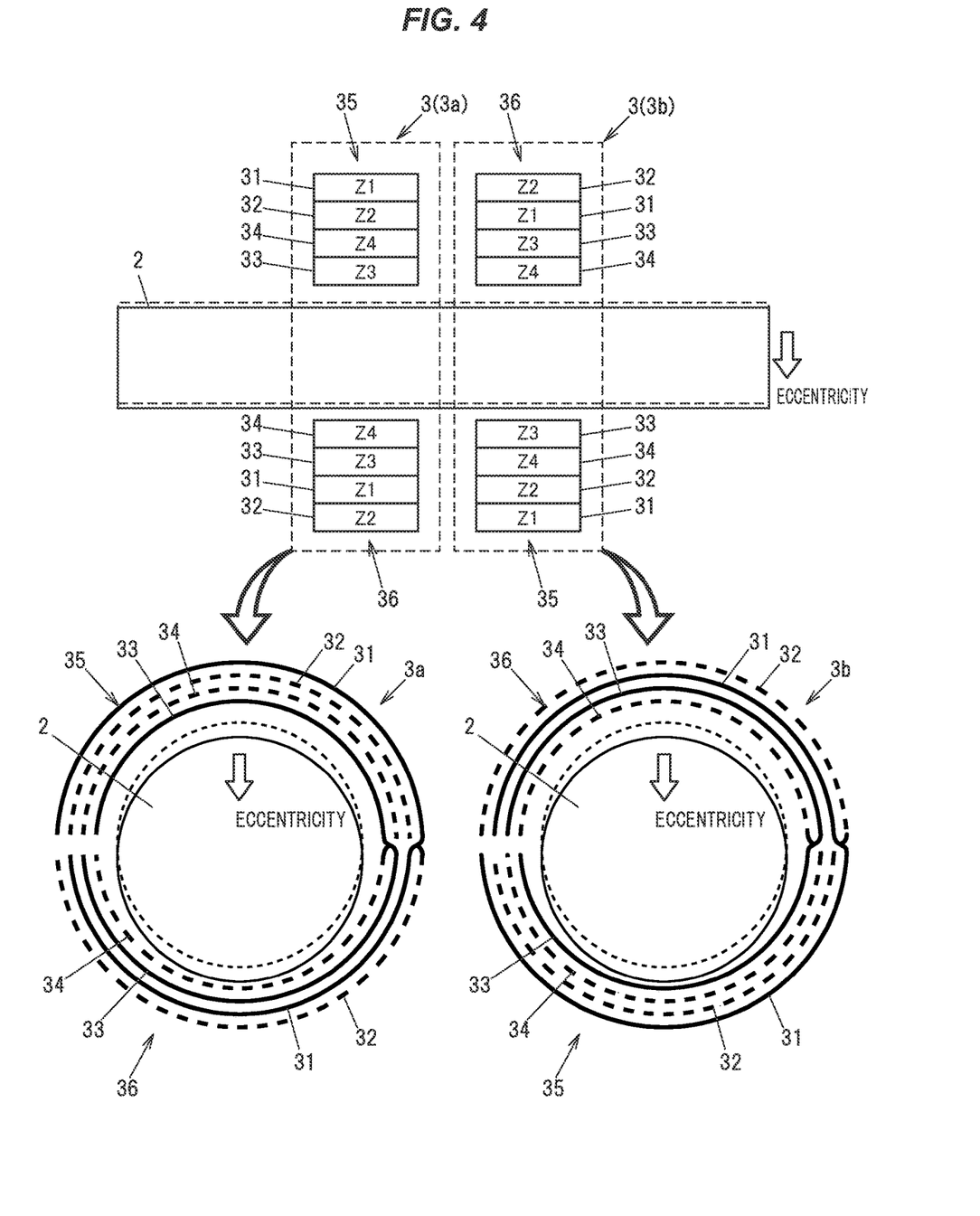
FIG. 4 is an explanatory diagram illustrating arrangement of first to fourth detection coils of the pair of detection unis.
Figure 5:
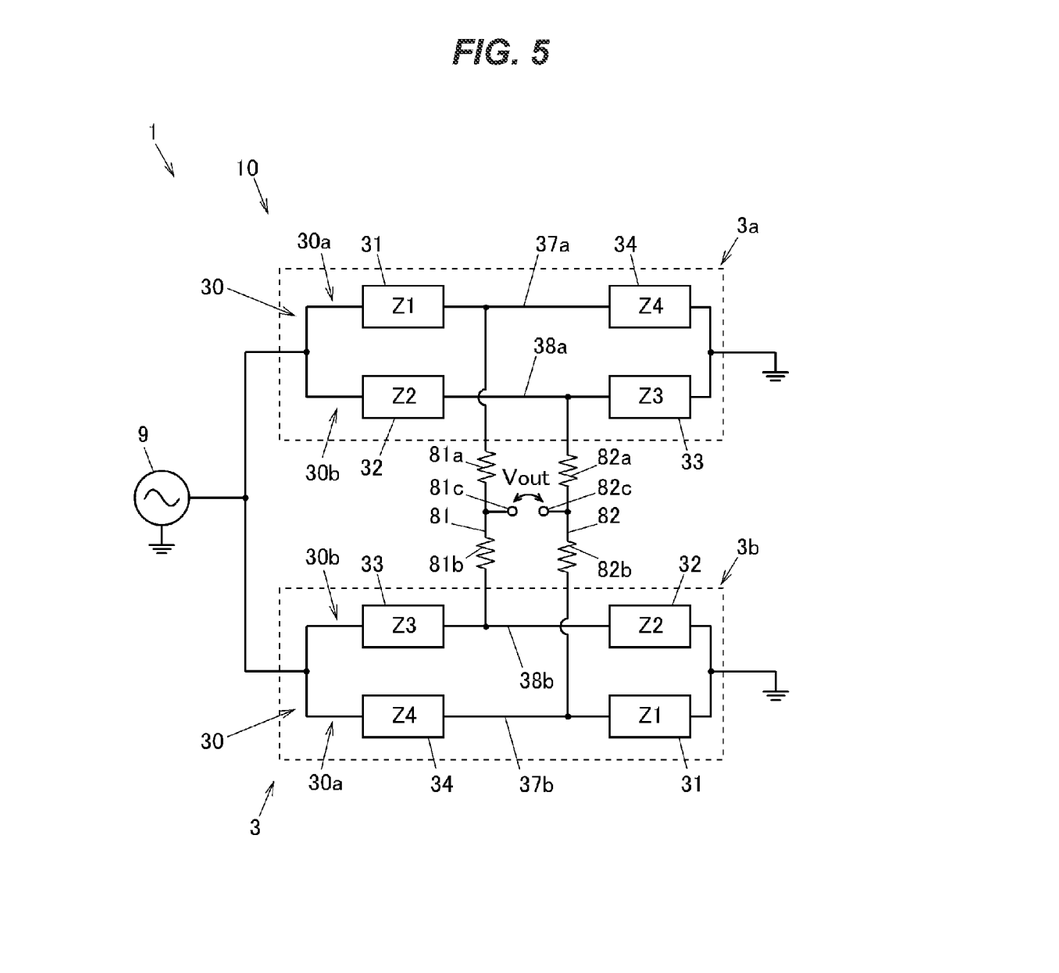
FIG. 5 is a circuit diagram illustrating a torque detection device including the torque sensor.

FIG. 1 is a perspective view showing an appearance of a magnetostrictive torque sensor in the present embodiment. FIG. 2A is a perspective view showing a pair of detection units of the torque sensor shown in FIG. 1 and FIG. 2B is a cross-sectional view showing a stacking structure of a flexible substrate and a magnetic ring. FIG. 3 is a diagram illustrating an example of a wiring pattern formed on each wiring layer of the flexible substrate. FIG. 4 is an explanatory diagram illustrating arrangement of first to fourth detection coils of the pair of detection unis. FIG. 5 is a circuit diagram illustrating a torque detection device including the torque sensor.

As shown in FIG. 5, a torque detection device 1 includes a torque sensor 10 and a drive unit 9 as an AC power source to generate AC voltage for operation of the torque sensor 10, and detects a torque transmitted by a shaft 2. The shaft 2 is, e.g., a drive shaft to which a drive force of a vehicle's drive source such as an engine is transmitted, and it has magnetostrictive properties that magnetic permeability changes when stress (in this example, torque) is applied.

As the shaft 2, it is possible to use, e.g., a shaft formed using a base material made of a chrome steel containing chrome, such as a chrome steel, a chrome-molybdenum steel or a nickel-chrome molybdenum steel, which is treated by carburizing, quenching and tempering and is then shot peened. Mechanical strength, including toughness, of the shaft 2 can be enhanced by carburizing, quenching and tempering. Meanwhile, by performing shot peening after carburizing, quenching and tempering, it is possible to cause martensitic transformation (diffusionless transformation) to occur on the surface and thereby possible to reduce non-magnetic austenite and increase ferromagnetic martensite. As a result, a change in magnetic permeability when stress is applied becomes large due to a decrease in the non-magnetic region and an increase in the magnetic region on the surface of the shaft 2, plastic deformation decreases, and hysteresis due to stress fluctuation thus can be reduced.

The torque sensor 10 has a pair of cylindrical detection units 3 through which the shaft 2 is inserted, and a molded resin portion 7 covering the pair of detection units 3. The molded resin portion 7 is to protect the pair of detection units 3 and is formed by molding a resin so as to cover the pair of detection units 3, as shown in FIG. 1.

The molded resin portion 7 integrally has a main body 71 covering the pair of detection units 3, and two flanges 72 protruding outward from the main body 71. A through-hole 71a for passing the shaft 2 is formed on the main body 71. Short cylindrical collars 73 made of a metal are held on each of the flanges 72. The torque sensor 10 is fixed to a non-rotating member, such as, e.g., a stay or a housing fixed to a vehicle body, by bolts inserted into the collars 73.

The pair of detection units 3 are formed in a cylindrical shape and are arranged around the shaft 2 so as to be aligned in an axial direction of the shaft 2. The pair of detection units 3 are arranged close to each other inside the main body 71 because if a distance between the detection units 3 is too large, it causes a decrease in detection accuracy or an increase in the size of the torque sensor 10.

As shown in FIG. 2A, each of the pair of detection units 3 has a cylindrical bobbin 5 arranged coaxially with and at a distance from the shaft 2, a cylindrical curved flexible substrate 6 wrapped around the bobbin 5, and a cylindrical magnetic ring 4 covering a circumference of the flexible substrate 6.

The bobbin 5 is formed of a non-magnetic material such as resin and supports the flexible substrate 6. The magnetic ring 4 is made of e.g., a magnetic body such as powder magnetic core or amorphous soft magnetic material and serves to reduce magnetic resistance of a magnetic circuit and also to suppress a decrease in sensitivity due to leakage of magnetic fluxes generated by detection coils 31 to 34 (described later) to the outside.

As shown in FIG. 2B, the flexible substrate 6 has four wiring layers 60, two of which form a pair and the other two form another pair. That is, the flexible substrate 6 has two pairs of wiring layers 60. In more particular, the flexible substrate 6 has the four wiring layers 60; a first wiring layer 61, a second wiring layer 62, a third wiring layer 63 and a fourth wiring layer 64, from the magnetic ring 4 side (the outer side) toward the bobbin 5 side (the inner side), where the first wiring layer 61 and the second wiring layer 62 are used as a pair and the third wiring layer 63 and the fourth wiring layer 64 are used as a pair. The wiring layer 60 is a collective term for the first to fourth wiring layers 61 to 64. In this regard, the number of the wiring layers 60 is not limited thereto as long as there are not less than four layers.

The fourth wiring layer 64 is formed on a front surface (a surface on the bobbin 5 side; the same applies hereafter) of a first base resin layer 65a made of a polyimide and a back surface (a surface on the magnetic ring 4 side; the same applies hereafter) of the first base resin layer 65a is adhesively fixed to the third wiring layer 63 via an adhesive layer 66b. A first coverlay layer 67a made of a polyimide is provided on a front surface of the fourth wiring layer 64 via an adhesive layer 66a to provide insulation. A double-sided tape 68a is stuck to a front surface of the first coverlay layer 67a, and the flexible substrate 6 is adhesively fixed to the bobbin 5 via the double-sided tape 68a.

The third wiring layer 63 is formed on a front surface of a second base resin layer 65b made of a polyimide and the second wiring layer 62 is formed on a back surface of the second base resin layer 65b.

The first wiring layer 61 is formed on a back surface of a third base resin layer 65c made of a polyimide and a front surface of the third base resin layer 65c is adhesively fixed to the second wiring layer 62 via an adhesive layer 66c. A second coverlay layer 67b made of a polyimide is provided on a back surface of the first wiring layer 61 via an adhesive layer 66d to provide insulation. A double-sided tape 68b is stuck to the second coverlay layer 67b, and the flexible substrate 6 is adhesively fixed to the magnetic ring 4 via the double-sided tape 68b.

The second wiring layer 62 and the third wiring layer 63, which are inner layers of the flexible substrate 6, are made of rolled copper foil. The first wiring layer 61 and the fourth wiring layer 64, which are outer layers of the flexible substrate 6, are made of a material obtained by plating electrolytic copper foil with copper. The first and fourth wiring layers 61, 64 as the outer layers are plated since it is necessary to form vias (through-holes) on the flexible substrate 6 of the torque sensor 10, as will be described in detail later.

FIG. 3 is a diagram illustrating an example of a wiring pattern formed on each wiring layer 60 of the flexible substrate 6. FIG. 3 schematically shows the wiring pattern of each of the wiring layers 60 (the first to fourth wiring layers 61 to 64) when the flexible substrate 6 is unfolded into a flat surface.

As shown in FIG. 3, the first to fourth detection coils 31 to 34 are formed on the first to fourth wiring layers 61 to 64 of the flexible substrate 6. That is, each of the pair of detection units 3 are configured in such a manner that the first to fourth detection coils 31 to 34 are stack in a radial direction.

The first and third detection coils 31, 33 have first straight portions 31a, 33a inclined at a predetermined angle relative to the axial direction of the shaft 2, while the second and fourth detection coils 32, 34 have second straight portions 32a, 34a inclined in an opposite direction to the first straight portions 31a, 33a at the predetermined angle relative to the axial direction of the shaft 2. Since change in magnetic permeability when torque is applied to the shaft 2 is greatest in the direction of ±45 degrees relative to the axial direction, it is possible to improve detection sensitivity by forming the first straight portions 31a, 33a with an inclination of +45° relative to the axial direction and forming the second straight portions 32a, 34a with an inclination of −45° relative to the axial direction.

In the torque sensor 10, the wiring patterns are partially interchanged between the wiring layer 60 forming the first detection coil 31 and the wiring layer 60 forming the second detection coil 32, hence, each of the first and second detection coils 31, 32 is formed across two paired wiring layers 60 (the first and second wiring layers 61, 62). Thus, a portion of the first detection coil 31 is arranged on a radially outward side (outer periphery side) of the second detection coil 32 and the other portion of the first detection coil 31 is arranged on a radially inward side (inner periphery side) of the second detection coil 32. In the present embodiment, both detection units 3 are configured in such a manner that a circumferential length of a region in which the first detection coil 31 is arranged on the radially outward side of the second detection coil 32 (a first region 35 described later) is equal to a circumferential length of a region in which the first detection coil 31 is arranged on the radially inward side of the second detection coil 32 (a second region 36 described later).

Likewise, in the torque sensor 10, the wiring patterns are partially interchanged between the wiring layer 60 forming the third detection coil 33 and the wiring layer 60 forming the fourth detection coil 34, hence, the third and fourth detection coils 33, 34 are formed across two paired wiring layers 60 (the third and fourth wiring layers 63, 64). Thus, a portion of the third detection coil 33 is arranged on a radially outward side (outer periphery side) of the fourth detection coil 34 and the other portion of the third detection coil 33 is arranged on a radially inward side (inner periphery side) of the fourth detection coil 34. In the present embodiment, both detection units 3 are configured in such a manner that a circumferential length of a region in which the third detection coil 33 is arranged on the radially outward side of the fourth detection coil 34 (the second region 36 described later) is equal to a circumferential length of a region in which the third detection coil 33 is arranged on the radially inward side of the fourth detection coil 34 (the first region 35 described later). The flexible substrate 6 has plural vias, and the plural wiring layers 60 are electrically connected through the vias.

By forming each of the detection coils 31 to 34 across two wiring layers 60, it is possible to suppress an effect of a characteristic difference between two wiring layers 60. As a result, it is possible to suppress measurement errors caused by the characteristic difference between the wiring layers 60 and to improve measurement accuracy. In addition, by forming each of the detection coils 31 to 34 across two wiring layers 60, it is also possible to suppress offset voltage due to the effect of eccentricity of the shaft 2 relative to the detection units 3.

Currents flowing through the wiring patterns on the first wiring layer 61 and the third wiring layer 63 are in the same direction as currents flowing through the wiring patterns on the second wiring layer 62 and the fourth wiring layer 64. In FIG. 3, the directions of the currents are indicated by outline arrows. In addition, in FIG. 3, input-side electrodes of the first to fourth detection coils 31 to 34 are indicated by the reference signs 31b, 32b, 33b, 34b, and output-side electrodes are indicated by the reference signs 31c, 32c, 33c, 34c. Furthermore, the reference signs a-y and A-Y in FIG. 3 are provided for descriptive purposes to represent connections through the vias, and the same reference signs are electrically connected to each other through the via. The wiring pattern on each wiring layer 60 shown in FIG. 3 is only an example, and the specific structure of the wiring pattern is not limited thereto.

Next, the details of arrangement of each of the detection coils 31 to 34 will be described in reference to FIG. 4. As shown in FIG. 4, in both detection units 3, the third detection coil 33, the fourth detection coil 34, the second detection coil 32 and the first detection coil 31 are arranged sequentially from radially inside to outside in a region substantially half the entire circumference (hereinafter, referred to as the first region 35). Likewise, in both detection units 3, the fourth detection coil 34, the third detection coil 33, the first detection coil 31 and the second detection coil 32 are arranged sequentially from radially inside to outside in a region substantially half the entire circumference (hereinafter, referred to as the second region 36). The pair of detection units 3 have the same stacking structure of the first to fourth detection coils 31 to 34 and are arranged at positions relatively rotated 180 degrees in a circumferential direction. Hereinafter, one of the detection units 3 (the detection unit 3 on the left side in FIG. 4) is referred to as a first detection unit 3a and the other detection unit 3 (the detection unit 3 on the right side in FIG. 4) is referred to as a second detection unit 3b.

When a direction in which eccentricity is likely to occur between the shaft 2 and the detection units 3a, 3b is known, the two detection units 3a, 3b are desirably arranged so that such a direction coincides with a direction in which the first region 35 and the second region 36 face each other. In the present embodiment, assuming that the direction in which eccentricity is likely to occur between the shaft 2 and the detection units 3a, 3b is a vertical direction, the two detection units 3a, 3b are arranged so that the first region 35 and the second region 36 face each other in the vertical direction.

As shown in FIG. 5, in each of the two detection units 3a, 3b of the torque sensor 10, a series-parallel circuit 30 is formed by the first to fourth detection coils 31 to 34. The series-parallel circuit 30 is configured in such a manner that a series circuit 30a formed by series connecting the first and fourth detection coils 31, 34 is parallel connected to a series circuit 30b formed by series connecting the second and third detection coils 32, 33. The first to fourth detection coils 31 to 34 have the same number of turns and are configured to have the same impedance.

The drive unit 9 applies AC voltage between ends of the series circuits 30a, 30b of each of the detection units 3a, 3b for AC excitation of the first to fourth detection coils 31 to 34. In FIG. 5, impedances of the first to fourth detection coils 31 to 34 when the AC voltage from the drive unit 9 is applied to the series-parallel circuits 30 are respectively indicated by Z1-Z4.

In the torque sensor 10, the AC voltage in opposite directions is applied by the drive unit 9 to the series-parallel circuits 30 of both detection units 3. In the example shown in the drawing, the first detection unit 3a is arranged in such a manner that the drive unit 9 is connected to ends of the series circuits 30a, 30b on the first and second detection coils 31, 32-side and ends of the series circuits 30a, 30b on the third and fourth detection coils 33, 34-side are electrically grounded. Meanwhile, the second detection unit 3b is arranged in such a manner that the drive unit 9 is connected to ends of the series circuits 30a, 30b on the third and fourth detection coils 33, 34-side and ends of the series circuits 30a, 30b on the first and second detection coils 31, 32-side are electrically grounded.

The torque sensor 10 also has first and second connection lines 81, 82 that connect between the pair of detection units 3. By the first connection line 81, a connecting portion 37a between the first detection coil 31 and the fourth detection coil 34 of the first detection unit 3a is connected to a connecting portion 38b between the second detection coil 32 and the third detection coil 33 of the second detection unit 3b. By the second connection line 82, a connecting portion 38a between the second detection coil 32 and the third detection coil 33 of the first detection unit 3a is connected to a connecting portion 37b between the first detection coil 31 and the fourth detection coil 34 of the second detection unit 3b.

The first connection line 81 has two resistors 81a, 81b that are connected in series. The second connection line 82 has two resistors 82a, 82b that are connected in series. The first and second connection lines 81, 82 also have first and second output contacts 81c, 82c that output voltage corresponding to a magnitude of torque transmitted by the shaft 2. The first output contact 81c outputs voltage between the two resistors 81a, 81b of the first connection line 81, and the second output contact 82c outputs voltage between the two resistors 82a, 82b of the second connection line 82. A potential difference between the first output contact 81c and the second output contact 82c is an output voltage Vout that corresponds to a magnitude of torque transmitted by the shaft 2. The output voltage Vout is converted into a digital value by, e.g., an AD converter and is used to control a vehicle's drive source (engine or electric motor) or to control an automatic gearbox (automatic transmission), etc.

Resistance values of the resistors 81a, 81b are the same as resistance values of the 82a, 82b. In addition, the resistance values of the resistors 81a, 81b, 82a, 82b are such values that a current flowing between the connecting portion 37a and the connecting portion 38b through the first connection line 81 and a current flowing between the connecting portion 38a and the connecting portion 37b through the second connection line 82 can be ignored. However, these resistors 81a, 81b, 82a, 82b may be omitted in case that the currents flowing between the first detection unit 3a and the second detection unit 3b through the first and second connection lines 81, 82 do not affect torque detection accuracy even if the resistors 81a, 81b, 82a, 82b are omitted.

(Operation of Torque Sensor and Torque Detection Device)

Next, an operation of the torque sensor 10 and the torque detection device 1 will be described. When the drive unit 9 applies AC voltage to the series-parallel circuits 30 of both detection units 3a, 3b, this AC voltage excites the first to fourth detection coils 31 to 34 which thereby generate magnetic fluxes. Since the first to fourth detection coils 31 to 34 are arranged around the shaft 2 to be subjected to stress measurement, the magnetic fluxes generated in the first to fourth detection coils 31 to 34 pass though the shaft 2. Since the shaft 2 is a magnetostrictive material with magnetostrictive properties as described above, its magnetic permeability changes according to torque transmitted by the shaft 2 and this causes changes in impedances (mainly inductances) of the first to fourth detection coils 31 to 34.

When, e.g., a torque in one direction of rotation is applied to the shaft 2 and causes an increase in the impedances of the first and third detection coils 31, 33 and a decrease in the impedances of the second and fourth detection coils 32, 34, or when a torque in the other direction of rotation is applied to the shaft 2 and causes a decrease in the impedances of the first and third detection coils 31, 33 and an increase in the impedances of the second and fourth detection coils 32, 34, the series-parallel circuits 30 become unbalanced and a potential difference corresponding to the torque applied to the shaft 2 is generated between the connecting portion 37a and the connecting portion 38a in the first detection unit 3a and between the connecting portion 37b and the connecting portion 38b in the second detection unit 3b. Thus, the output voltage Vout is generated between the first connection line 81 and the second connection line 82 and the torque applied to the shaft 2 can thereby be detected.

Now, an effect of eccentricity between the shaft 2 and the detection units 3a, 3b will be discussed. When the position of the shaft 2 shifts from the center of the detection units 3a, 3b due to vibration, etc., a distance between the shaft 2 and each of the detection coils 31 to 34 changes. As a result, even if, e.g., the shaft is rotating in a no-load state with no torque applied, the series-parallel circuits 30 become unbalanced and the output voltage Vout changes from zero V. That is, it causes an error in the torque detection value. Hereinafter, voltage which is output in a state with no torque applied to the shaft 2 is referred to as offset voltage.

Such offset voltage due to the effect of eccentricity can be suppressed to some extent by providing a structure in which the first and second detection coils 31, 32 are formed across two wiring layers 60 and the third and fourth detection coils 33, 34 are formed across other two wiring layers 60 (hereinafter, referred to as a two-segment split coil structure) as in the torque sensor 10 of the present embodiment. However, if torque detection accuracy is further enhanced by suppressing errors caused by eccentricity of the shaft 2, it is possible to contribute to more sophisticated vehicle control.

In the present embodiment, offset voltage is further suppressed by using two detection units 3, connecting between midpoints (connecting the connecting portion 37a to the connecting portion 38b, and the connecting portion 38a to the connecting portion 37b) of the series-parallel circuits 30 respectively constituting the detection units 3 through the first connection line 81 and the second connection line 82, and outputting the potential difference between the first and second connection lines 81, 82.

In more particular, when, e.g., eccentricity as shown in FIG. 4 occurs, the shaft 2 moves closer to the second region 36 and away from the first region 35 of the first detection unit 3a. On the other hand, the shaft 2 moves closer to the first region 35 and away from the second region 36 of the second detection unit 3b. Thus, changes in the offset voltage of the two detection units 3a, 3b due to the effect of eccentricity are the same magnitude but in opposite directions. Therefore, when outputs of both series-parallel circuits 30 are combined by connecting the connecting portion 37a to the connecting portion 37b, and the connecting portion 38a to the connecting portion 38b through the first and second connection lines 81, 82, the offset voltage due to the effect of eccentricity is cancelled out. In this way, in the torque sensor 10, generation of the offset voltage due to the effect of eccentricity is suppressed by adopting the two-segment split coil structure, arranging the two detection units 3 having the same structure in a state of being rotated 180 degrees from each other, and combining the outputs of these two detection units 3.

Figure 6:
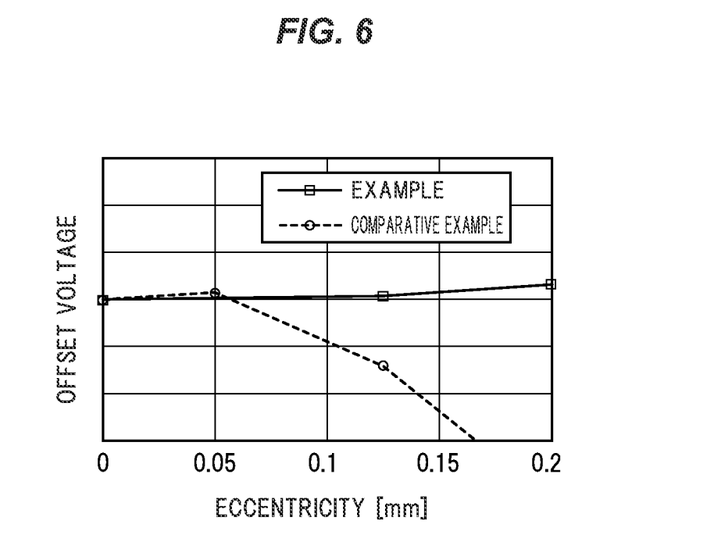
FIG. 6 is a graph showing measurement results of changes in offset voltage with respect to a magnitude of eccentricity between a shaft and the detection units.

FIG. 6 is a graph showing measurement results of offset voltage with respect to a magnitude of eccentricity between the shaft 2 and the detection units 3a, 3b (a distance between a central axis of the shaft 2 and central axes of the detection units 3a, 3b). In FIG. 6, offset voltage when using a torque sensor with only one detection unit 3 having the two-segment split coil structure is also shown as Comparative Example. As shown in FIG. 6, in the torque detection device 1 in Example of the present embodiment, the offset voltage due to the effect of eccentricity is significantly suppressed as compared to measurement results in Comparative Example.

(Modification)

Figure 7A:
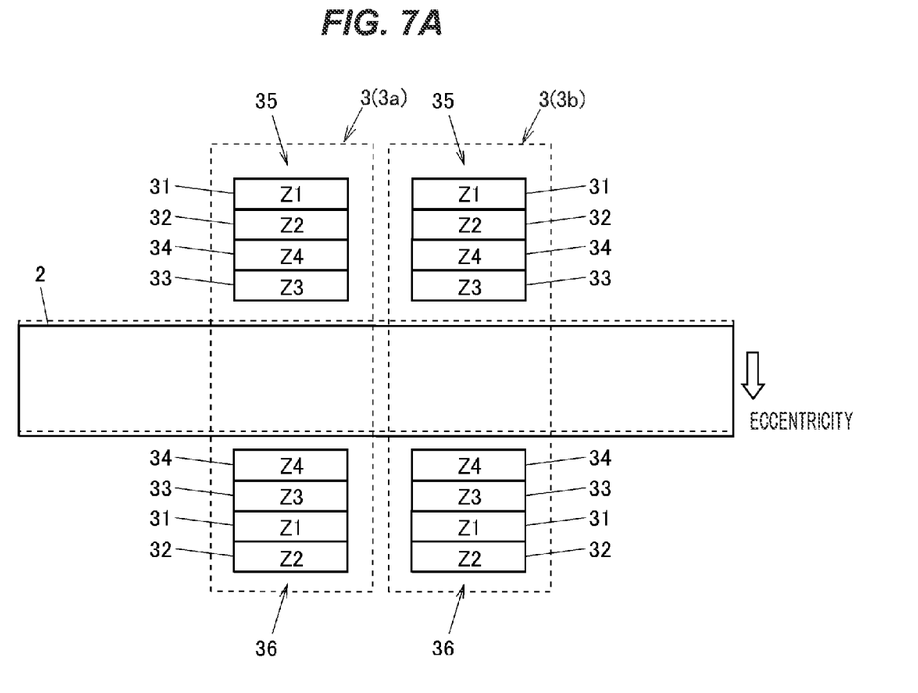
FIG. 7A is an explanatory diagram illustrating arrangement of the first to fourth detection coils of the pair of detection units and FIG. 7B is a circuit diagram illustrating the torque sensor.
Figure 7B:
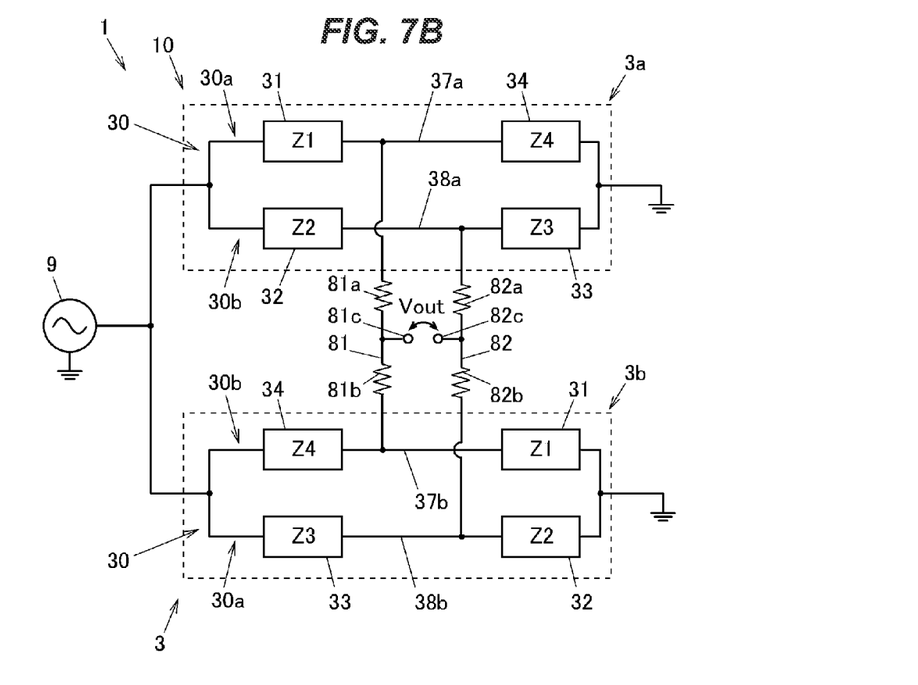

Although the pair of detection units 3 are arranged in a state of being rotated 180 degrees from each other in the embodiment described above, it is not limited thereto. The pair of detection units 3a, 3b may be arranged so that their rotational positions along the circumferential direction are the same, as shown in FIG. 7A. In this case, the positions of the first and second detection coils 31, 32 are interchanged and also the positions of the third and fourth detection coils 33, 34 are interchanged in the series-parallel circuit 30 of the second detection unit 3b in FIG. 5 so as to have a circuit configuration shown in FIG. 7B. Then, the connecting portions 37a, 37b between the first and fourth detection coils 31, 34 of the pair of detection units 3a, 3b are connected to each other by the first connection line 81, and the connecting portions 38a, 38b between the second and third detection coils 32, 33 of the pair of detection units 3a, 3b are connected to each other by the second connection line 82. When configuring in this manner, the configuration is substantially the same as that in the embodiment described above and it is possible to obtain the same effects.

Functions and Effects of the Embodiment

As described above, the torque detection device 1 using the torque sensor 10 can suppress the offset voltage due to the effect of eccentricity between the shaft 2 and the detection units 3 and can detect torque with high accuracy.

SUMMARY OF THE EMBODIMENT

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A torque sensor (10) to detect torque transmitted by a shaft (2) having magnetostrictive properties, the torque sensor (10) comprising: a pair of cylindrical detection units (3a, 3b) arranged around the shaft (2) and aligned side-by-side in an axial direction of the shaft (2); and first and second connection lines (81, 82) connecting the pair of detection units (3a, 3b), wherein each of the pair of detection units (3a, 3b) comprises first and third detection coils (31, 33) comprising first straight portions (31a, 33a) inclined at a predetermined angle relative to the axial direction of the shaft (2) and second and fourth detection coils (32, 34) comprising second straight portions (32a, 34a) inclined in an opposite direction to the first straight portions (31a, 33a) at the predetermined angle relative to the axial direction of the shaft (2), wherein the first to fourth detection coils (31 to 34) are stacked in a radial direction, wherein the first to fourth detection coils (31 to 34) form a series-parallel circuit (30) in which a series circuit (30a) formed by series connecting the first and fourth detection coils (31, 34) is parallel connected to a series circuit (30b) formed by series connecting the second and third detection coils (32, 33), wherein the first connection line (81) connects a connecting portion between the first and fourth detection coils (31, 34) of one (3a) of the pair of detection units (3a, 3b) to one of a connecting portion between the first and fourth detection coils (31, 34) and a connecting portion between the second and third detection coils (32, 33) of the other detection unit (3b), wherein the second connection line (82) connects a connecting portion between the second and third detection coils (32, 33) of the one (3a) of the pair of detection units (3a, 3b) to the other of the connecting portion between the first and fourth detection coils (31, 34) and the connecting portion between the second and third detection coils (32, 33) of the other detection unit (3b), and wherein the torque transmitted by the shaft (2) is detected based on a potential difference between the first connection line (81) and the second connection line (82).

[2] The torque sensor (10) described in [1], wherein each of the pair of detection units (3) comprises a cylindrical curved flexible substrate (6) comprising four wiring layers (60), wherein each of the first and second detection coils (31, 32) is formed across two of the four wiring layers (60) so that a portion of the first detection coil (31) is arranged on a radially outward side of the second detection coil (32) and the other portion of the first detection coil (31) is arranged on a radially inward side of the second detection coil (32), and wherein each of the third and fourth detection coils (33, 34) is formed across the other two of the four wiring layers (60) so that a portion of the third detection coil (33) is arranged on a radially outward side of the fourth detection coil (34) and the other portion of the third detection coil (33) is arranged on a radially inward side of the fourth detection coil (34).

[3] The torque sensor (10) described in [2], wherein the flexible substrate (6) is configured in such a manner that a circumferential length of a region with the first detection coil (31) arranged on the radially outward side of the second detection coil (32) is equal to that of a region with the first detection coil (31) arranged on the radially inward side of the second detection coil (32), and a circumferential length of a region with the third detection coil (33) arranged on the radially outward side of the fourth detection coil (34) is equal to that of a region with the third detection coil (33) arranged on the radially inward side of the fourth detection coil (34).

[4] A torque detection device (1), comprising: the torque sensor (10) described in any one of [1] to [3]; and a drive unit (9) that generates AC voltage for AC excitation of the series-parallel circuits (30), wherein the pair of detection units (3) have the same stacking structure of the first to fourth detection coils (31 to 34) and the same configuration of the series-parallel circuit (30) and the AC voltages in opposite directions are applied to the series-parallel circuits (30), wherein the pair of the detection units (3a, 3b) are arranged at positions relatively rotated 180 degrees in a circumferential direction, wherein the first connection line (81) connects a connecting portion between the first and fourth detection coils (31, 34) of one (3a) of the pair of detection units (3a, 3b) to a connecting portion between the second and third detection coils (32, 33) of the other detection unit (3b), and wherein the second connection line (82) connects a connecting portion between the second and third detection coils (32, 33) of the one (3a) of the pair of detection units (3a, 3b) to a connecting portion between the first and fourth detection coils (31, 34) of the other detection unit (3b).

[5] A torque detection device (1), comprising: the torque sensor (10) described in any one of [1] to [3]; and a drive unit (9) that generates AC voltage for AC excitation of the series-parallel circuits (30), wherein the pair of detection units (3a, 3b) have the same stacking structure of the first to fourth detection coils (31 to 34) and the same configuration of the series-parallel circuit (30) and the AC voltages in opposite directions are applied to the series-parallel circuits (30), wherein the pair of the detection units (3a, 3b) are arranged so that their rotational positions along a circumferential direction are the same, wherein the first connection line (81) connects between the respective connecting portions between the first and fourth detection coils (31, 34) of the pair of detection units (3a, 3b), and wherein the second connection line (82) connects between the respective connecting portions between the second and third detection coils (32, 33) of the pair of detection units (3a, 3b).

Although the embodiment and modification of the invention has been described, the invention according to claims is not to be limited to the embodiment and modification described above. Further, please note that not all combinations of the features described in the embodiment and modification are necessary to solve the problem of the invention. In addition, the invention can be appropriately modified and implemented without departing from the gist thereof.

The invention claimed is:

1. A torque sensor to detect torque transmitted by a shaft having magnetostrictive properties, the torque sensor comprising:
a pair of cylindrical detection units arranged around the shaft and aligned side-by-side in an axial direction of the shaft; and
first and second connection lines connecting the pair of detection units,
wherein each of the pair of detection units comprises first and third detection coils comprising first straight portions inclined at a predetermined angle relative to the axial direction of the shaft and second and fourth detection coils comprising second straight portions inclined in an opposite direction to the first straight portions at the predetermined angle relative to the axial direction of the shaft,
wherein the first to fourth detection coils are stacked in a radial direction,
wherein the first to fourth detection coils form a series-parallel circuit in which a series circuit formed by series connecting the first and fourth detection coils is parallel connected to a series circuit formed by series connecting the second and third detection coils,
wherein the first connection line connects a connecting portion between the first and fourth detection coils of one of the pair of detection units to one of a connecting portion between the first and fourth detection coils and a connecting portion between the second and third detection coils of the other detection unit,
wherein the second connection line connects a connecting portion between the second and third detection coils of the one of the pair of detection units to the other of the connecting portion between the first and fourth detection coils and the connecting portion between the second and third detection coils of the other detection unit,
wherein the torque transmitted by the shaft is detected based on a potential difference between the first connection line and the second connection line,
wherein each of the pair of detection units comprises a cylindrical curved flexible substrate comprising four wiring layers,
wherein each of the first and second detection coils is formed across two of the four wiring layers so that a portion of the first detection coil is arranged on a radially outward side of the second detection coil and the other portion of the first detection coil is arranged on a radially inward side of the second detection coil, and
wherein each of the third and fourth detection coils is formed across the other two of the four wiring layers so that a portion of the third detection coil is arranged on a radially outward side of the fourth detection coil and the other portion of the third detection coil is arranged on a radially inward side of the fourth detection coil.

2. A torque detection device, comprising:
the torque sensor according to claim 1; and
a drive unit that generates AC voltage for AC excitation of the series-parallel circuits,
wherein the pair of detection units have a same stacking structure of the first to fourth detection coils and a same configuration of the series-parallel circuit and the AC voltages in opposite directions are applied to the series-parallel circuits,
wherein the pair of the detection units are arranged so that their rotational positions along a circumferential direction is the same,
wherein the first connection line connects between the respective connecting portions between the first and fourth detection coils of the pair of detection units, and
wherein the second connection line connects between the respective connecting portions between the second and third detection coils of the pair of detection units.

3. The torque sensor according to claim 1,
wherein the flexible substrate is configured in such a manner that a circumferential length of a region with the first detection coil arranged on the radially outward side of the second detection coil is equal to that of a region with the first detection coil arranged on the radially inward side of the second detection coil, and a circumferential length of a region with the third detection coil arranged on the radially outward side of the fourth detection coil is equal to that of a region with the third detection coil arranged on the radially inward side of the fourth detection coil.

4. A torque detection device, comprising:
the torque sensor according to claim 1; and
a drive unit that generates AC voltage for AC excitation of the series-parallel circuits,
wherein the pair of detection units have a same stacking structure of the first to fourth detection coils and a same configuration of the series-parallel circuit and the AC voltages in opposite directions are applied to the series-parallel circuits,
wherein the pair of the detection units are arranged at positions relatively rotated 180 degrees in a circumferential direction,
wherein the first connection line connects a connecting portion between the first and fourth detection coils of one of the pair of detection units to a connecting portion between the second and third detection coils of the other detection unit, and wherein the second connection line connects a connecting portion between the second and third detection coils of the one of the pair of detection units to a connecting portion between the first and fourth detection coils of the other detection unit.

* * * * *